INVENTOR
LESLIE A. RUNTON

BY [signature]

ATTORNEY 3,490,484
Patented Jan. 20, 1970

3,490,484
VALVE FOR HIGH PRESSURE PIPE LINES
Leslie A. Runton, 8 Elm Drive, Canton, Mass. 02021
Filed Mar. 7, 1968, Ser. No. 711,387
Int. Cl. F16k *1/12, 1/38, 31/163*
U.S. Cl. 137—219                      9 Claims

ABSTRACT OF THE DISCLOSURE

A valve for high pressure pipe lines comprising a valve housing having a pair of valve heads to be advanced to close ports to the upstream and downstream pipes, respectively. Each head includes a chamber to which hydraulic fluid is supplied for advancing the head to closed position. A piston sliding in a cylinder is attached to each head to retract the head under hydraulic pressure to open position. Control valves are provided to control the supply of hydraulic fluid to the various cylinders and chambers for actuating the heads.

---

This invention relates to pipe valves and has for an object to provide a valve for controlling the flow of fluids in a pipe which is suitable for operation by remote control and in which no moving parts extend outwardly through the pipe to require packing.

Another object is to provide a valve of the above type which is fluid tight whereby no leakage can take place.

Another object is to provide such a valve which is suited for use in high pressure pipe lines of large diameter such as those commonly used to transport oil or gas for long distances and which can be opened or closed with a relatively small force.

Another object is to provide a valve construction wherein the pressure of the fluid within the pipe is caused to assist in the manipulation of the valve.

Various other objects and advantages will be apparent as the nature of the invention is more fully disclosed.

In accordance with the present invention, the valve construction includes a housing to be inserted in the pipe containing a valve chamber having a pair of valve seats disposed at opposite sides and registering respectively with the upstream and downstream portions of the pipe. Valve heads are slidably disposed in the valve chamber in a position to seal against the respective valve seats when advanced and to be retracted into the valve chamber for opening purposes. The valve heads are arranged to be opened and closed by hydraulic means from an outside controlled source. The hydraulic connections are such that the reaction of the high pressure fluid on the valve head facing upstream is transferred to the hydraulic actuating fluid acting on the valve head facing downstream so as to hold the latter firmly closed against its seat. When the valves are to be reopened, the valve on the high pressure side is firmly closed to cut off the high pressure from the valve chamber and allow the low pressure valve to be retracted after which both valve heads are fully retracted and locked in retracted positions. These operations can be effected locally or from a remote point and do not require access to the pipe. The valves are thus suitable for use in large pipe lines as well as in small lines such as in missiles or with radio-active fluids, as they are completely sealed at all times.

The nature of the invention will be better understood from the following description, taken in connection with the accompanying drawing in which a specific embodiment has been set forth for purposes of illustration.

Figure 1:
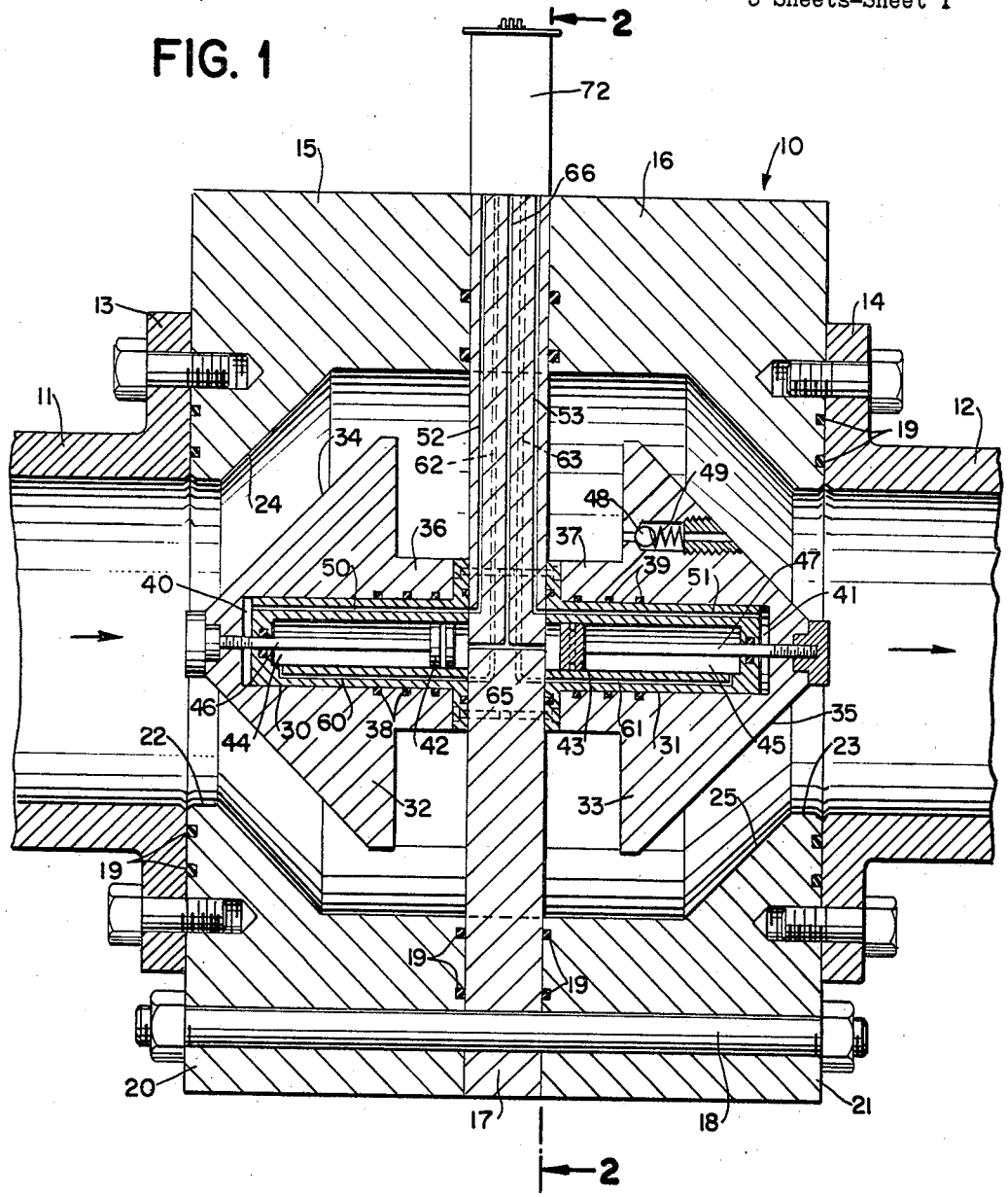
FIG. 1 is a longitudinal section through a valve embodying the invention showing the valve inserted in a pipe line.
Figure 2:
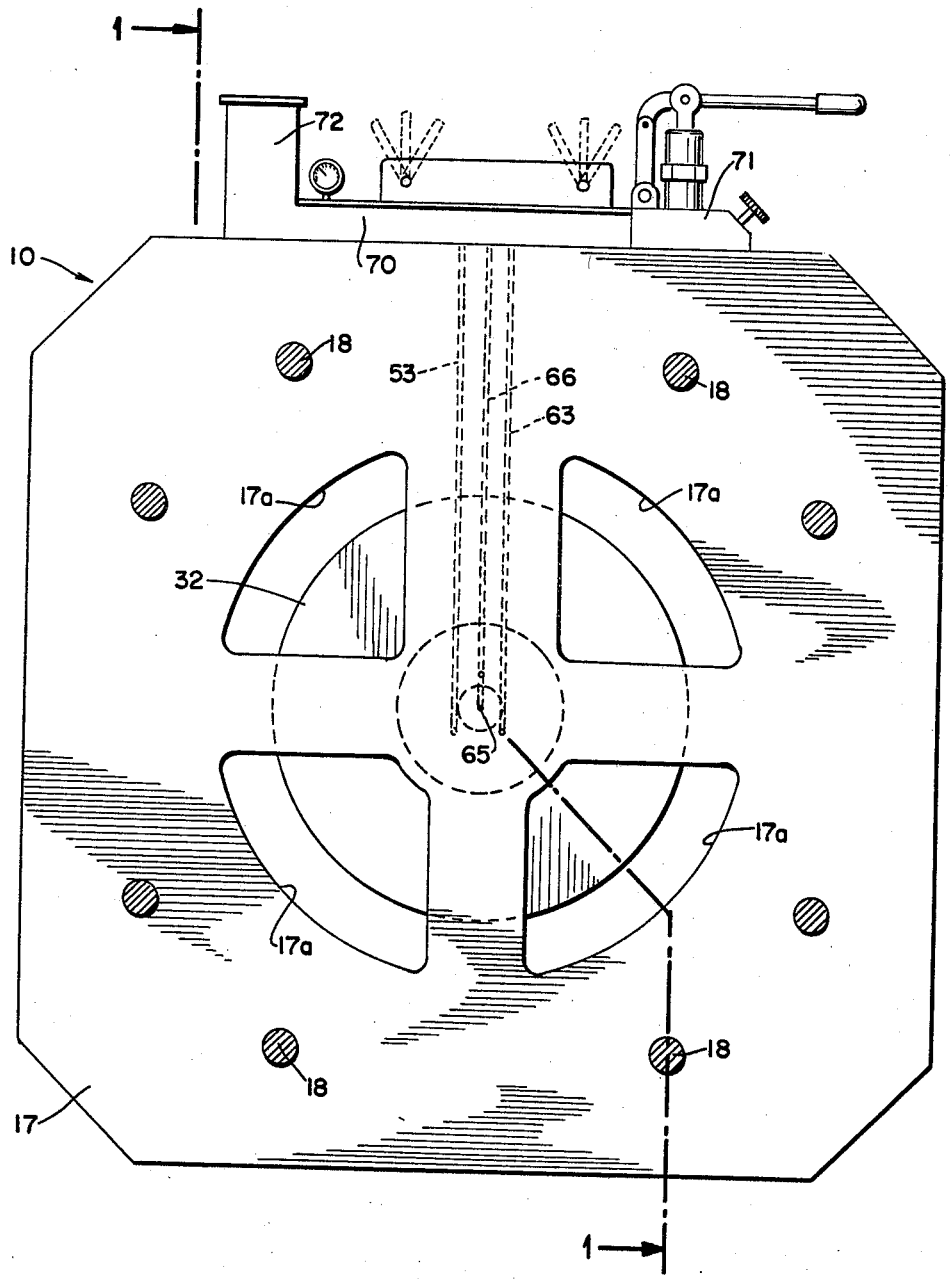
FIG. 2 is a partial transverse section taken on the line 2—2 of FIG. 1 showing the valve control mechanism.

Referring to the drawings more in detail, a valve housing 10 is shown as connected between two pipes 11 and 12 having flanges 13 and 14, respectively. The valve housing 10 is composed of two symmetrical parts 15 and 16 separated by a transverse center plate 17 having openings 17a for the passage of liquid. The parts 15 and 16 and the plate 17 are of a size to register with the pipe flanges 13 and 14 and the parts are secured together by a circle of bolts 18 which extend through the flanges and through the housing parts. Suitable sealing rings 19 which may be composed of rubber, or of plastic or of metal depending upon the temperatures and materials to which they are to be subjected, are disposed between the various parts for effecting a fluid tight seal.

End walls 20 and 21 of the parts 15 and 16, respectively, are formed with openings 22 and 23 registering with the pipes 11 and 12 and carry conical flanges 24 and 25 extending into the valve chamber to form valve seats.

Hollow studs 30 and 31 are bolted to opposite sides of the plate 17 in axial alignment with the axes of the pipes 11 and 12. Valve heads 32 and 33 are formed with conical outer surfaces 34 and 35 which are adapted to seat in the valve seats formed by the conical flanges 24 and 25 for closing the openings 22 and 23 to the pipes 11 and 12, respectively. These valve heads 32 and 33 are formed with axial sleeves 36 and 37 which are adapted to slide over the outer surfaces of the studs 30 and 31 as the valve heads are advanced or retracted for closing or opening the valves. Suitable packings 38 and 39 are provided between the sleeves 36 and 37 and the studs 30 and 31 to form a closure for sleeve cylinders 40 and 41 which are formed within the sleeves 36 and 37 beyond the ends of the studs 30 and 31.

Pistons 42 and 43 are disposed to slide in cylinders 44 and 45 within the hollow studs 30 and 31. These pistons are connected by rods 46 and 47 through the ends of the studs 30 and 31 to valve heads 32 and 33, respectively. A pressure relief valve 48 closed by a spring 49 is disposed in the valve head 43 and is positioned to open in response to excessive pressure in the valve chamber when the valve head 43 is retracted from fully closed position.

Axial passages 50 and 51 in the studs 30 and 31 communicate with the chambers 40 and 41 in the sleeves 36 and 37 and with vertical passages 52 and 53 in the center plate 17. Axial passages 60 and 61 in the studs 30 and 31 communicate with the cylinders 44 and 45 on the forward sides of the pistons 42 and 43 and with vertical passages 62 and 63 in the center plate 17. Axial passage 65 in the center plate 17 communicates with the cylinders 44 and 45 on the rearward sides of the pistons 42 and 43 and with a common vertical passage 66 in the plate 17.

A hydraulic valve block 70 is disposed on the center plate 17 in registration with the vertical passages 52, 53, 62, 63, and 66. This block is connected to a source of hydraulic pressure 71, shown as a hand pump, and to a receiver 72. Three-way valves, not shown, which may comprise spool valves, slide valves, or remote controlled solenoid valves, in the block 70 actuated by control handles 73 and 74 selectively connect the various passages to the hydraulic pressure source 71 or to the receiver 72 as indicated in the hydraulic diagram of FIG. 3.

Figure 3:
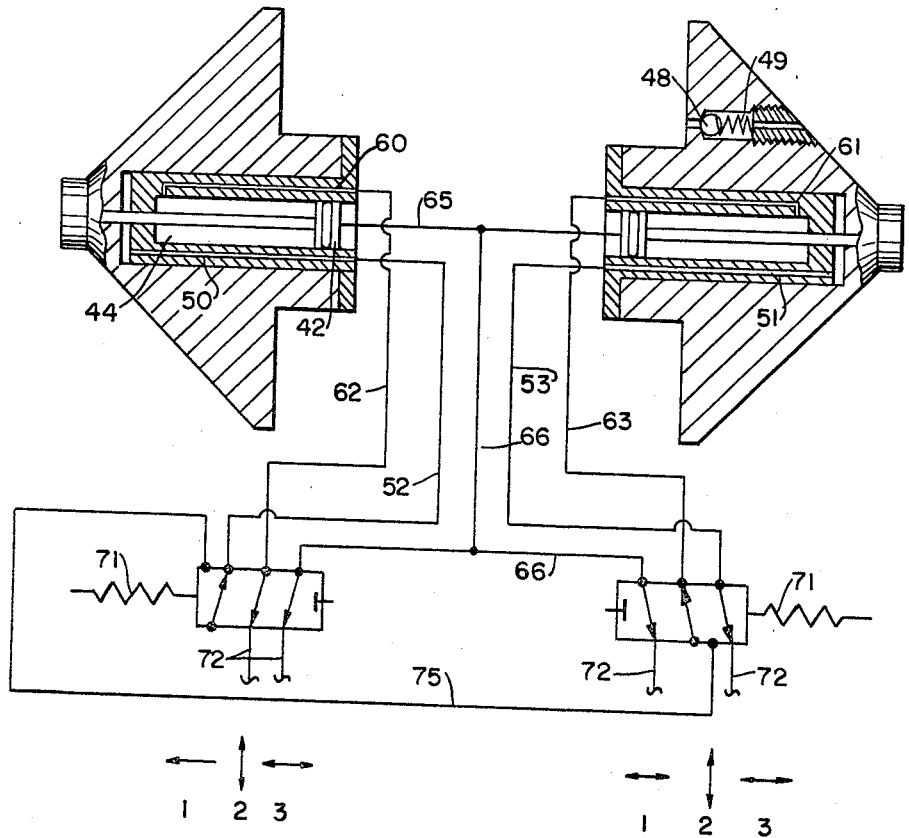
FIG. 3 is a diagrammatic view illustrating the hydraulic connections.

Referring to FIG. 3, and assuming that the direction of flow is from pipe 11 to pipe 12 with the valve head 32 facing upstream and the valve head 33 facing downstream, the control handle 73 in the position marked "open" connects the passage 62 to the hydraulic pressure source 71 for exerting pressure in the cylinder 44 in advance of the piston 42 in a direction to retract the valve head 32 and open the passage to the pipe 11. It also connects the passages 52 and 66 to the receiver 72 for relieving the pressure on the closing sides of the valve head 32 and the piston 42. When the control handle 73 is in "close" position, the passages 62 and 66 are connected to the receiver 72 and the passage 52 is connected to the hydraulic pressure source 71 to apply hydraulic pressure to the chamber 40 for causing the valve head 32 to seat against the valve seat 24. When the handle 73 is in "lock" position, the passages 62 and 66 are closed so that they remain full of hydraulic liquid and prevent movement of the valve heads. The passage 52 is connected to a line 75 for the purpose to be described.

When the control handle 74 is in "open" position, the passage 63 is connected to the source 71 of hydraulic pressure to supply hydraulic pressure to the cylinder 45 in a direction to cause the valve head 33 to be retracted to open position. At the same time, the passages 53 and 66 are connected to the receiver 72. When the handle 74 is in "close" position, the passages 63 and 66 are connected to the receiver 72 and the passage 53 is connected to the source 71 of hydraulic pressure for advancing the valve head 33 into seated position. When the control handle 74 is in "lock" position, the passage 53 is connected to the line 75 and passages 63 and 66 are closed so as to maintain hydraulic pressure therein and prevent movement of the parts.

OPERATION

In the operation of this system in connection with a large diameter pipe line carrying liquid under high pressure and with both valve heads 32 and 33 in fully open position, the control handles 73 and 74 would be set in "lock" positions with both valve heads retracted and held in retracted positions by the blocked passages 62 and 63. Assuming that the liquid flow is from the pipe 11 to the pipe 12, in order to close the valve, the handle 73 controlling the valve head 32 is first shifted into "close" position. In this position, the hydraulic pressure in the passage 62 which held the valve head 32 in retracted position is relieved and hydraulic pressure is supplied to the chamber 40. However, since the valve head is advanced against the pressure of the liquid flowing in the pipe line, it may not fully close at this time but will serve to cut down the flow somewhat so as to prevent the valve head 33 on the downstream side from closing with an undesirable impact. If the fluid pressure in the pipe line is not too great, this first step can be omitted.

For the second step, the handle 74 is shifted to "close" position to connect the passage 63 to the receiver 72 and to connect the passage 53 to the source of hydraulic pressure 71 so as to supply hydraulic pressure to the chamber 41 to advance the valve head 33 to seated position. Since this valve head is on the downstream side, the liquid flow in the pipe line assists the closing operation and, as pointed out above, may cause the valve head to seat with an undesirable impact unless the flow has first been reduced by the partial closing of the upstream valve head 32.

The valve chamber 10 now fills with the liquid from the pipe 11 and equalizes the pressure on the two sides of the valve head 32 so that the latter fully closes under the hydraulic pressure in its chamber 40.

With the valves fully closed, the handles 73 and 74 are shifted to "lock" position wherein the passages 52 and 53 are connected together through the line 75. Under this condition, the upstream fluid pressure against the valve head 32 serves to increase the hydraulic pressure in the chamber 40 and this pressure is applied to the chamber 41 to increase the closing pressure on the valve head 33. Any leakage around the upstream valve head 32 also serves to increase the closing pressure against the downstream valve head 33. Hence, the latter is maintained closed by the fluid pressure in the pipe line and becomes more firmly seated as the pipe line pressure increases.

When the valve is to be opened, the handle 73 is first shifted to "close" position to disconnect the passage 52 from the passage 53 and to connect the passage 52 to the hydraulic pressure source 71. This causes the valve head 32 to become fully closed and cut off leakage from the pipe 11 into the valve casing 10. The handle 74 is then shifted to "open" position to supply hydraulic pressure to the cylinder 45 in a direction to retract the valve head 33.

If the opening of the valve head 33 is opposed by liquid pressure within the valve casing 10, the pressure relief valve 48 opens to relieve the initial pressure and allow the valve head to be retracted. As soon as liquid flows past the valve head 33, the pressure differential is equalized and the valve head can be fully retracted by the hydraulic pressure in the cylinder 45.

When the valve head 33 has been fully retracted, the handle 73 is shifted to "open" position to release the hydraulic pressure in the chamber 40 and apply hydraulic pressure to the cylinder 44 in a direction to retract the valve head 32. This action is aided by the fluid head in the pipe 11. With both valve heads retracted, the handles 73 and 74 are both shifted to "lock" position to close the passages 62 and 63 and thus lock the heads in open position.

It will be noted that no moving part projects outside of the valve housing. Hence, there is no possibility of leakage to the outside. Also, the system is adapted to remote control as the valve control handles can be operated by relays or by suitable electric means from a remote point.

What is claimed is:

1. A valve for pipe lines comprising a casing having spaced inlet and outlet ports, a valve seat registering with each of said ports, a valve head mounted to be advanced against each of said seats or to be retracted therefrom for closing or opening said ports, hydraulic means for advancing each of said heads into seating position and means interconnecting said hydraulic means whereby hydraulic pressure developed by one of said heads in response to the pipe line pressure is transferred hydraulically to the other of said heads for increasing the sealing pressure thereof.

2. A valve as set forth in claim 1 in which said hydraulic means comprises a fixed stud coaxial with each of said ports and a sleeve on each of said heads sliding on said studs and forming therewith a hydraulic chamber and means supplying hydraulic pressure to each of said chambers for advancing the respective heads into seated position.

3. A valve as set forth in claim 2 in which said studs are hollow to form hydraulic cylinders and pistons sliding in said cylinders are connected to actuate said heads.

4. A valve as set forth in claim 3 having means supplying hydraulic fluid to said cylinders for retracting said heads.

5. A valve as set forth in claim 4 including hydraulic passages connected to supply hydraulic fluid to the respective cylinders for advancing or retracting said valve heads, and means blocking said passages for locking said valve heads in advanced or retracted positions.

6. A valve as set forth in claim 1 including a transverse central plate dividing said casing into two symmetrical parts and having passages therein for the flow of the pipe line fluid, oppositely disposed hollow studs carried by said plate in axial alignment with the respective ports, valve heads slidably mounted on said studs to be advanced or retracted, hydraulic chambers in said heads, pistons sliding in said hollow studs connected to said heads for actuating the same, passages in said studs communicating with said cylinders on opposite sides of said pistons and with said chamber, a source of high pressure hydraulic fluid, a low pressure receiver and selective valve means to connect each of said passages to said high pressure source or to said receiver for advancing or retracting said valve heads.

7. A valve as set forth in claim 6 including valve means to selectively block said passages for locking said valve heads against movement.

8. A valve as set forth in claim 7 including valve means said chambers.

9. A valve as set forth in claim 8 in which a pressure relief valve is carried by one of said valve heads to open in response to excessive fluid pressure in said valve casing.

References Cited

UNITED STATES PATENTS

| | | | |
|---|---|---|---|
| 2,085,893 | 7/1937 | Boland | 137—219 |
| 3,429,331 | 2/1969 | Prevost | 137—219 |

M. CARY NELSON, Primary Examiner

MICHAEL O. STRUM, Assistant Examiner